United States Patent
Yahagi et al.

(10) Patent No.: US 10,942,374 B2
(45) Date of Patent: Mar. 9, 2021

(54) OPTICAL FILM FOR EYEWEAR, AND OPTICAL LAMINATE AND EYEWEAR USING THE OPTICAL FILM

(71) Applicant: NIPPON KAYAKU KABUSHIKI KAISHA, Tokyo (JP)

(72) Inventors: Yoshiyuki Yahagi, Tokyo (JP); Kouichi Tanaka, Tokyo (JP); Saki Abe, Tokyo (JP); Yuki Aikawa, Tokyo (JP)

(73) Assignee: NIPPON KAYAKU KABUSHIKI KAISHA, Tokyo (JP)

(*) Notice: Subject to any disclaimer, the term of this patent is extended or adjusted under 35 U.S.C. 154(b) by 138 days.

(21) Appl. No.: 16/152,904

(22) Filed: Oct. 5, 2018

(65) Prior Publication Data
US 2019/0049754 A1 Feb. 14, 2019

Related U.S. Application Data

(63) Continuation of application No. PCT/JP2017/014378, filed on Apr. 6, 2017.

(30) Foreign Application Priority Data

Apr. 8, 2016 (JP) .............................. JP2016-078365

(51) Int. Cl.
*G02C 7/12* (2006.01)
*G02C 7/10* (2006.01)
*G02B 5/30* (2006.01)
*B32B 7/02* (2019.01)

(52) U.S. Cl.
CPC ................. *G02C 7/12* (2013.01); *B32B 7/02* (2013.01); *G02B 5/30* (2013.01); *G02C 7/10* (2013.01)

(58) Field of Classification Search
USPC ................................ 351/49, 159.56, 159.62
See application file for complete search history.

(56) References Cited

U.S. PATENT DOCUMENTS

| | | | |
|---|---|---|---|
| 2002/0042653 A1 | 4/2002 | Copeland et al. | |
| 2004/0011994 A1 | 1/2004 | Yumoto et al. | |
| 2004/0263736 A1 | 12/2004 | Graham et al. | |
| 2005/0078245 A1 | 4/2005 | Sasaki et al. | |
| 2007/0052886 A1 | 3/2007 | Fan et al. | |

(Continued)

FOREIGN PATENT DOCUMENTS

| | | |
|---|---|---|
| CN | 105652550 A | 6/2016 |
| EP | 3 165 949 A1 | 5/2017 |

(Continued)

OTHER PUBLICATIONS

International Search Report for corresponding International Application No. PCT/JP2017/014378 dated Jul. 4, 2017.

(Continued)

*Primary Examiner* — Darryl J Collins
(74) *Attorney, Agent, or Firm* — Pearne & Gordon LLP

(57) ABSTRACT

An optical film for eyewear includes a light control layer and at least one light reflection layer laminated in this order from an outer side with respect to a viewer. The light reflection layer includes a cholesteric liquid crystal layer that reflects left-handed circularly polarized light or right-handed circularly polarized light in a visible light range, and the light control layer is a quarter wave plate.

7 Claims, 10 Drawing Sheets

(56) References Cited

U.S. PATENT DOCUMENTS

| | | | |
|---|---|---|---|
| 2007/0228325 A1 | 10/2007 | Yumoto | |
| 2011/0188115 A1* | 8/2011 | Sharp | G02B 30/25 |
| | | | 359/465 |
| 2014/0185267 A1* | 7/2014 | Kim | G02B 5/3016 |
| | | | 362/19 |
| 2014/0233105 A1* | 8/2014 | Schmeder | G02C 7/12 |
| | | | 359/590 |
| 2016/0377889 A1* | 12/2016 | Lazar | G02B 5/3083 |
| | | | 351/49 |
| 2018/0046021 A1 | 2/2018 | Li | |

FOREIGN PATENT DOCUMENTS

| | | |
|---|---|---|
| GB | 2 314 167 A | 12/1997 |
| JP | 2001-180200 A | 7/2001 |
| JP | 2002-179668 A | 6/2002 |
| JP | 2003-306491 A | 10/2003 |
| JP | 2003-313292 A | 11/2003 |
| JP | 2003-315556 A | 11/2003 |
| JP | 2004-029824 A | 1/2004 |
| JP | 2006-011281 A | 1/2006 |
| JP | 2007-271808 A | 10/2007 |
| JP | 2009-288312 A | 12/2009 |
| JP | 2013-200452 A | 10/2013 |
| WO | 2006/023006 A2 | 3/2006 |
| WO | 2016/002582 A1 | 1/2016 |

OTHER PUBLICATIONS

Written Opinion for corresponding International Application No. PCT/JP2017/014378 dated Jul. 4, 2017.

Extended European Search Report dated Nov. 27, 2019 for corresponding European Application No. 17779208.2.

English Translation of Written Opinion for corresponding International Application No. PCT/JP2017/014378 dated Jul. 4, 2017.

International Preliminary Report on Patentability for corresponding International Application No. PCT/JP2017/014378 dated Oct. 9, 2018.

Japanese Office Action dated Jul. 29, 2020 for corresponding Japanese Application No. 2018-510661 and English translation.

Chinese Office Action dated Jul. 3, 2020 for corresponding Chinese Application No. 201780021714.2 and English translation.

* cited by examiner

OPTICAL FILM FOR EYEWEAR, AND OPTICAL LAMINATE AND EYEWEAR USING THE OPTICAL FILM

CROSS REFERENCE TO RELATED APPLICATIONS

This is a continuation application of International Patent Application No. PCT/JP2017/014378 filed Apr. 6, 2017, which claims the benefit of Japanese Patent Application No. 2016-078365 filed Apr. 8, 2016, the full contents of all of which are hereby incorporated by reference in their entirety.

BACKGROUND

Technical Field

The present disclosure relates to an optical film mainly used in eyewear (such as sunglasses, goggles, and a helmet visor), and an optical laminate and eyewear using the optical film.

Description of the Related Art

Eyewear (such as sunglasses, goggles, and a visor) is used to reduce brightness due to reflected light from, for example, a water surface, a road surface, or a snow surface. For example, lenses of sunglasses are colored by pigment or the like so that reflected light is absorbed by the pigment. Accordingly, the amount of light incident on eyes of the wearer of the sunglasses is reduced, and thus brightness is reduced. However, typically, light reflected at a water surface or a snow surface becomes polarized light, and thus polarization sunglasses are effective particularly for this reflected light. Polarization sunglasses are designed to effectively absorb (cut) light in the polarization direction of the polarized reflected light, thereby reducing brightness and improving visibility.

In an optical film used in polarization sunglasses, typically, a polarization element is sandwiched between support bodies made of a plastic material such as polycarbonate. Polarization sunglasses can be produced by fabricating the optical film having such a configuration into a desired shape and fitting the optical film to a frame. The polarization element is a film in which what is called a dichromatic pigment such as a dichromatic dye or an iodine-rich polyvinyl alcohol (PVA) complex is uniaxially oriented together with polymer such as PVA. Linear polarization elements in various colors can be obtained depending on the color of used pigment. All most all typical sunglasses are colored in a gray color to have polarization characteristics across the entire visible light range.

The surface of each lens is coated with a multi-layered film by evaporation in some cases to achieve a desired design of polarization sunglasses or further improvement of visibility. When the multi-layered film is provided, light reflected at the lens surface is visually recognized in blue, green, and red metallic color tones by others not wearing polarization sunglasses, and view with reduced brightness and further improved visibility is obtained through the lens by the wearer of polarization sunglasses because particular polarized light is reflected. Thus, the multi-layered film is useful in terms of the visibility for the wearer. However, sebum or the like adhering to the multi-layered film on the lens surface is hard to remove, which causes handling difficulties. In addition, the multi-layered film is likely to peel off at a place such as sea where polarization sunglasses are exposed to moisture and salt air, and thus lacks an adhesion property. Furthermore, when a spherical lens for eyewear is coated with a multi-layered film by evaporation, it is difficult to achieve uniform evaporation coating on a flat site and a curved site, which causes manufacturing difficulties.

Such problems can be solved by providing a multi-layered film on the inner side a support body, in other words, between a polarization element and the support body. However, the multi-layered film achieves reflection performance based on a refractive index difference between layers. Thus, when the multi-layered film is provided between the polarization element and the support body, it is difficult for the multi-layered film to obtain reflection performance equivalent to that at an air interface on the outside. In addition, the multi-layered film is made of an inorganic material, which makes it difficult to achieve bonding with the polarization element as an organic substance.

Japanese Patent Application Laid-Open No. 2001-180200 discloses a method of obtaining reflected light in a metallic color tone by using an organic substance without a multi-layered film. In this method, an optical laminate includes a cholesteric liquid crystal layer, and a light modulation layer containing a pigment or a dye. Cholesteric liquid crystal is liquid crystal molecules in a helically oriented state, and has a function to selectively reflect a circularly polarized light component in a direction same as the helical direction of the liquid crystal molecules in a particular wavelength band depending on the length of a helical pitch. Japanese Patent Application Laid-Open No. 2001-180200 discloses that the optical laminate, which includes the cholesteric liquid crystal layer in which the orientation of such cholesteric liquid crystal is fixed, and the light modulation layer, exhibits a vivid color tone and is excellent in ornamentation.

Cholesteric liquid crystal has a circularly polarized light selective reflection characteristic that selectively reflects a circularly polarized light component in a particular wavelength band. In other words, only circularly polarized light is transmitted through a cholesteric liquid crystal layer. Thus, when the cholesteric liquid crystal layer disclosed in Japanese Patent Application Laid-Open No. 2001-180200 is combined with a polarization element of conventional polarization sunglasses, the polarization element cannot sufficiently absorb transmitted light of circularly polarized light, which leads to increase of leakage light from the polarization element. This degrades the original function of the polarization sunglasses, and reduces an antiglare effect.

In addition, cholesteric liquid crystal and a high-performance polarization element are both expensive, and thus it is desired to provide the antiglare effect of polarization sunglasses at as low a cost as possible.

SUMMARY

The present disclosure is related to providing an optical film for eyewear which can be used to produce, at lower cost, an eyewear that achieves a high antiglare property and exhibits reflected light in a metallic color tone without using a linear polarization element, as well as an optical laminate and eyewear using the optical film.

According to a first aspect of the present disclosure, an optical film for eyewear includes a light control layer and at least one light reflection layer laminated in this order from an outer side with respect to a viewer. The light reflection layer includes a cholesteric liquid crystal layer that reflects left-handed circularly polarized light or right-handed circularly polarized light in a visible light range, and the light control layer is a quarter wave plate.

Further, it is preferable that two or more light reflection layers are laminated and each of the two or more laminated light reflection layers reflects circularly polarized light in an identical direction.

Further, it is preferable that a slow axis of the light control layer is arranged in a direction in which s-polarized light incident on the light control layer is converted into circularly polarized light in a direction the same as the direction of circularly polarized light reflected by the light reflection layer.

According to a second aspect of the present disclosure, an optical laminate includes a first support body, a second support body, and the optical film for eyewear according to the present disclosure arranged between the first support body and the second support body.

Further, it is preferable that the first support body and the second support body are each a substrate formed of a plastic material.

According to a third aspect of the present disclosure, Eyewear includes the optical film according to the present disclosure or the optical laminate according to the present disclosure.

Further, it is preferable that the eyewear is protection glasses for use after a cataract operation.

The present disclosure can provide an optical film for eyewear, which can be used to produce, at lower cost, eyewear that achieves a high antiglare effect and exhibits reflected light in a metallic color tone without using a linear polarization element, as well as an optical laminate and eyewear using the optical film.

Eyewear including the optical film or the optical laminate according to the present disclosure is applicable to medical glasses and the like. For example, the optical film according to the present disclosure in which a light reflection layer has a central reflected wavelength of 500 nm or shorter is applicable to, for example, protection glasses and the like for reducing brightness after a cataract operation.

BRIEF DESCRIPTION OF DRAWINGS

FIG. 3 illustrates spectrum data of the transmittance of each of an optical film in Example 4 and Comparative Example 4, the reflection color of which is silver.

DETAILED DESCRIPTION

Embodiments of the present disclosure will be described below with reference to the accompanying drawings. The following embodiments are merely some typical exemplary embodiments of the present disclosure, and various kinds of additional changes may be performed within the scope of the present disclosure.

<Optical Film>

Figure 1:
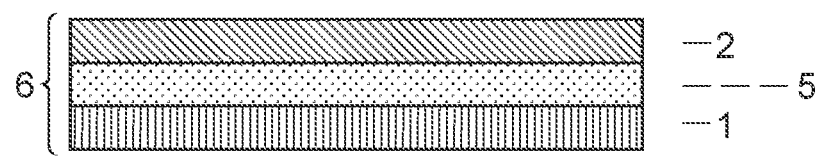
FIG. 1 is a side sectional view illustrating a typical embodiment of an optical film according to the present disclosure.

An optical film for eyewear according to the present disclosure includes at least one light reflection layer and a quarter wave plate as light control layer. The light reflection layer includes a cholesteric liquid crystal layer that reflects left-handed circularly polarized light or right-handed circularly polarized light in a visible light range. Specifically, the optical film for eyewear according to the present disclosure includes the light control layer and the light reflection layer laminated in this order from an outer side with respect to a viewer. In other words, the light control layer (quarter wave plate) and the at least one light reflection layer are laminated in this order when the optical film for eyewear is viewed from the front side. The outer side with respect to a viewer (or wearer) of eyewear is a side on which light is incident on the optical film when the optical film is applied to the eyewear. The outer side corresponds to the "front side" of the optical film, and a viewer side corresponds to the "back side" of the optical film. FIG. 1 illustrates an embodiment of the optical film for eyewear according to the present disclosure. An optical film 6 illustrated in FIG. 1 includes a light control layer 2 and a light reflection layer 1 which are laminated in this order with a bonding layer 5 interposed therebetween. The bonding layer 5 is made of a bonding agent or an adhesive agent. In FIG. 1, the layers forming the optical film 6 are laminated with the bonding layer 5 interposed therebetween, but the light control layer 2 and the light reflection layer 1 may be directly laminated each other. When the optical film 6 illustrated in FIG. 1 is applied to eyewear, the light reflection layer 1 corresponds to the back side of the optical film 6, and the light control layer 2 corresponds to the front side of the optical film 6.

(Light Reflection Layer)

The light reflection layer used in the present disclosure includes the cholesteric liquid crystal layer that reflects left-handed circularly polarized light or right-handed circularly polarized light in a visible light range. Circularly polarized light is roughly divided into two kinds. Clockwise circularly polarized light is referred to as right-handed circularly polarized light, and counterclockwise circularly polarized light is referred to as left-handed circularly polarized light. Since circularly polarized light has no polarization axis, high reflectance can be easily and reliably obtained only by selecting which of right-handed circularly polarized light and left-handed circularly polarized light is to be reflected by the light reflection layer. When the optical film for eyewear according to the present disclosure includes two or more light reflection layers, the two or more light reflection layers both preferably have a property of reflecting circularly polarized light in an identical direction. For example, when three cholesteric liquid crystal layers that each reflect left-handed circularly polarized light are laminated as light reflection layers, the three cholesteric liquid crystal layers all have a property of reflecting left-handed circularly polarized light. The number of laminated light reflection layers is not particularly limited, but is preferably one to five, more preferably one to three. When a plurality of light reflection layers are provided, an optical film having various reflection colors can be obtained, but the number of laminated light reflection layers is preferably in the range of one to five from viewpoints of, for example, the number of manufacturing processes and cost. The thickness of each light reflection layer is preferably 0.2 to 5 µm, more preferably 0.8 to 4 µm. When the thickness of each light reflection layer is smaller than 0.2 µm, the reflectance of a light reflection film formed by the light reflection layers potentially decreases. When the thickness of each light reflection layer is larger than 5 µm, defect occurs in orientation of cholesteric liquid crystals included in the light reflection layer, and the haze value of a light reflection film formed by the light reflection layers potentially increases.

The haze value of a light reflection film formed by laminating three or more light reflection layers is preferably equal to or smaller than 1.0%, more preferably equal to or smaller than 0.8%. When the haze value is larger than 1.0%, the light reflection film has a large opacity, and is not suitable for application to an optical member for which transparency is important.

The cholesteric liquid crystal layer is formed of a nematic liquid crystal having chirality, or a composition obtained by adding a chiral agent to a nematic liquid crystal. Helical orientation and reflected wavelength can be optionally designed by selecting the kind and amount of the chiral agent, and thus it is preferable to employ a method of obtaining a cholesteric liquid crystal by adding a chiral agent to a nematic liquid crystal. Unlike a liquid crystal that operates in an electric field, the nematic liquid crystal in the present disclosure is used while the helical orientation thereof is fixed, and thus it is preferable to use a nematic liquid crystal monomer containing a polymerizable group.

The nematic liquid crystal monomer containing a polymerizable group is a compound containing the polymerizable group in a molecule and having liquid crystallinity in a certain temperature range or a certain concentration range. Examples of the polymerizable group include a (meth) acryloyl group, a vinyl group, a chalconyl group, a cinnamoyl group, and an epoxy group. It is preferable that a mesogenic group is contained in a molecule for a polymerizable liquid crystal to have liquid crystallinity. The mesogenic group is, for example, a rod-shaped or plate-shaped substituent group such as a biphenyl group, a terphenyl group, a (poly)phenyl benzoate group, a (poly)ether group, a benzylideneaniline group, and an acenaphthoquinoxaline group, or a disk-shaped substituent group such as a triphenylene group, a phthalocyanine group, and an azacrown group. Thus, the mesogenic group is a group capable of inducing liquid crystal phase behavior. A liquid crystal compound containing a rod-shaped or plate-shaped group is known as a calamitic liquid crystal in the present technical field. Examples of nematic liquid crystal monomers containing such a polymerizable group include polymerizable liquid crystals disclosed in Japanese Patent Application Laid-Open No. 2003-315556 and Japanese Patent Application Laid-Open No. 2004-29824, Paliocolor (registered trademark) series (manufactured by BASF Ltd.) such as Paliocolor LC242 and Paliocolor LC1057, and RMM series (manufactured by Merck KGaA). These nematic liquid crystal monomers containing a polymerizable group may be used alone or may be used in combinations of two or more.

The chiral agent is preferably a compound that is capable of causing right-handed or left-handed helical orientation of the above-described nematic liquid crystal monomer containing a polymerizable group and contains a polymerizable group like the nematic liquid crystal monomer containing a polymerizable group. Such a chiral agent is, for example, Paliocolor LC756 (manufactured by BASF Ltd.), an optically active compound each having a binaphthyl structure, which is disclosed in, for example, Japanese Patent Application Laid-Open No. 2002-179668 or Japanese Patent Application Laid-Open No. 2007-271808, or an optically active compound having an isosorbide structure disclosed in, for example, Japanese Patent Application Laid-Open No. 2003-306491, or Japanese Patent Application Laid-Open No. 2003-313292. The direction of circularly polarized light to be reflected is determined by the kind of the chiral agent, and the reflected wavelength of a light reflection layer can be changed in accordance with the amount of the chiral agent added to nematic liquid crystal. For example, a light reflection layer that reflects light having a wavelength on a shorter wavelength side can be obtained by increasing the amount of the added chiral agent. The amount of the added chiral agent differs depending on the kind and reflected wavelength of the chiral agent, but is preferably 0.5 to 30 parts by weight approximately based on 100 parts by weight of the nematic liquid crystal monomer containing a polymerizable group, more preferably 1 to 20 parts by weight approximately, in order to adjust the central reflected wavelength of a light reflection layer to ordinary light to a desired wavelength region.

In addition, a polymerizable compound that can react with the nematic liquid crystal monomer containing a polymerizable group and has no liquid crystallinity may be added. Such a compound is, for example, ultraviolet curable resin. Examples of the ultraviolet curable resin include dipentaerythritol hexa(meth)acrylate, a reaction product of dipentaerythritol penta(meth)acrylate and 1,6-hexamethylene-diisocyanate, a reaction product of isocyanuric-ring-containing tri-isocyanate and pentaerythritol tri(meth)acrylate, a reaction product of pentaerythritol tri(meth)acrylate and isophorone-di-isocyanate, dipentaerythritol penta(meth)acrylate, dipentaerythritol tetra(meth)acrylate, pentaerythritol tetra(meth)acrylate, pentaerythritol tri(meth)acrylate, trimethylolpropane tri(meth)acrylate, ditrimethylolpropane tetra(meth)acrylate, tris (acryloxyethyl)isocyanurate, tris (methacryloxyethyl)isocyanurate, a reaction product of glycerol triglycidyl ether and (meth)acrylic acid, caprolactone denaturation tris (acryloxyethyl)isocyanurate, a reaction product of trimethylolpropane triglycidyl ether and (meth)acrylic acid, triglycerol-di-(meth)acrylate, a reaction product of propylene glycol-di-glycidyl ether and (meth)acrylic acid, polypropylene glycol-di-(meth)acrylate, tripropylene glycol-di-(meth)acrylate, polyethylene glycol-di-(meth)acrylate, tetraethylene glycol-di-(meth)acrylate, triethylene glycol-di-(meth)acrylate, pentaerythritol-di-(meth)acrylate, a reaction product of 1,6-hexanediol-di-glycidyl ether and (meth)acrylic acid, 1,6-hexanediol-di-(meth)acrylate, glycerol-di-(meth)acrylate, a reaction product of ethylene glycol-di-glycidyl ether and (meth) acrylic acid, a reaction product of diethylene glycol-di-glycidyl ether and (meth)acrylic acid, bis (acryloxyethyl) hydroxyethyl isocyanurate, bis (methacryloxyethyl) hydroxyethyl isocyanurate, a reaction product of bisphenol A-di-glycidyl ether and (meth)acrylic acid, tetrahydrofurfuryl (meth)acrylate, caprolactone denaturation tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxy hydroxypropyl (meth)acrylate, acryloyl morpholine, methoxy polyethylene glycol (meth)acrylate, methoxy tetraethylene glycol (meth)acrylate, methoxy triethylene glycol (meth)acrylate, methoxy ethylene glycol (meth)acrylate, methoxy ethyl (meth)acrylate, glycidyl (meth)acrylate, glycerol (meth)acrylate, ethyl carbitol (meth)acrylate, 2-ethoxyethyl (meth)acrylate, N,N-dimethylaminoethyl (meth)acrylate, 2-cyanoethyl (meth)acrylate, a reaction product of butyl glycidyl ether and (meth)acrylic acid, butoxy triethylene glycol (meth)acrylate, and butanediol mono(meth)acrylate. These resins may be used alone or may be used as a mixture of some of the resins. These ultraviolet curable resins having no liquid crystallinity need to be added in such an amount that a composition containing the nematic liquid crystal monomer does not lose liquid crystallinity, and the amount added is preferably 0.1 to 20 parts by weight based on 100 parts by weight of the nematic liquid crystal monomer containing a polymerizable group, more preferably 1.0 to 10 parts by weight approximately.

When the above-described nematic liquid crystal monomer containing a polymerizable group or any other polymerizable compound is ultraviolet curable, a photopolymerization initiator is further added to the composition for ultraviolet curing. Examples of the photopolymerization initiator include: 2-methyl-1-[4-(methylthio)phenyl]-2-morpholinopropane-1 (Irgacure 907 manufactured by BASF Ltd.), 1-hydroxy cyclohexyl phenyl ketone (Irgacure 184 manufactured by BASF Ltd.), 4-(2-hydroxyethoxy)-phenyl (2-hydroxy-2-propyl) ketone (Irgacure 2959 manufactured by BASF Ltd.), 1-(4-dodecylphenyl)-2-hydroxy-2-methyl-propan-1-one (Darocure 953 manufactured by Merck KGaA), 1-(4-isopropylphenyl)-2-hydroxy-2-methylpropan-1-one (Darocure 1116 manufactured by Merck KGaA), 2-hydroxy-2-methyl-1-phenylpropan-1-one (Irgacure 1173 manufactured by BASF Japan Ltd.), an acetophenone compound such as diethoxyacetophenone; benzoin compounds such as benzoin, benzoin methyl ether, benzoin ethyl ether, benzoin isopropyl ether, benzoin isobutyl ether, and 2,2-dimethoxy-2-phenylacetophenone (Irgacure 651 manufactured by BASF Ltd.); benzophenone compounds such as benzoylbenzoic acid, methyl benzoylbenzoate, 4-phenylbenzophenone, hydroxybenzophenone, 4-benzoyl-4'-methyldiphenyl sulfide, and 3,3'-dimethyl-4-methoxybenzophenone (Kayacure MBP manufactured by Nippon Kayaku Co., Ltd.); and thioxanthone compounds such as thioxanthone, 2-chlorothioxanthone (Kayacure CTX manufactured by Nippon Kayaku Co., Ltd.), 2-methylthioxanthone, 2,4-dimethylthioxanthone (Kayacure RTX manufactured by Nippon Kayaku Co., Ltd.), isopropyl thioxanthone, 2,4-dichlorothioxanthone (Kayacure CTX manufactured by Nippon Kayaku Co., Ltd.), 2,4-diethylthioxanthone (Kayacure DETX manufactured by Nippon Kayaku Co., Ltd.), or 2,4-diisopropylthioxanthone (Kayacure DITX manufactured by Nippon Kayaku Co., Ltd.). The photopolymerization initiator is preferably, for example, Irgacure TPO, Irgacure TPO-L, Irgacure OXE01, Irgacure OXE02, Irgacure 1300, Irgacure 184, Irgacure 369, Irgacure 379, Irgacure 819, Irgacure 127, Irgacure 907, or Irgacure 1173 (all manufactured by BASF Ltd.), more preferably, Irgacure TPO, Irgacure TPO-L, Irgacure OXE01, Irgacure OXE02, Irgacure 1300, or Irgacure 907. These photopolymerization initiators may be used alone or may be used as a mixture of some of the initiators at an optional ratio. It is preferable to use at least one kind of a photopolymerization initiator having an absorption band at a wavelength equal to or longer than 300 nm.

When a benzophenone compound or a thioxanthone compound is used as the photopolymerization initiator, an auxiliary agent may be additionally used to promote optical polymerization reaction. Examples of such an auxiliary agent include amine compounds such as triethanolamine, methyldiethanolamine, triisopropanolamine, n-butylamine, N-methyldiethanolamine, diethylaminoethyl methacrylate, Michler's ketone, 4,4'-diethylamino phenone, ethyl 4-dimethylaminobenzoate, (n-butoxy)ethyl 4-dimethylaminobenzoate, and isoamyl 4-dimethylaminobenzoate.

The amounts of the photopolymerization initiator and the auxiliary agent added can be in such a range that the liquid crystallinity of the composition used in the present disclosure is not affected. The amount of the photopolymerization initiator added is preferably 0.5 to 10 parts by weight, more preferably 2 to 8 parts by weight approximately, based on 100 parts by weight of ultraviolet-curable compound in the composition. The amount of the auxiliary agent added to the composition is preferably 0.5 to 2 times larger than the mass of the photopolymerization initiator.

The following describes a method of producing the light reflection layer used in the present disclosure by using the above-described cholesteric liquid crystal. In such a method, for example, a necessary amount of a chiral agent causing right-handed or left-handed helical orientation is added to a nematic liquid crystal monomer containing a polymerizable group to reflect light having a desired wavelength. Subsequently, these are dissolved into a solvent, and then a photopolymerization initiator is added. Such a solvent is not particularly limited as long as the solvent dissolves the liquid crystal monomer and the chiral agent in use and the like. The solvent is, for example, cyclopentanone, toluene, methyl ethyl ketone, or methyl isobutyl ketone, and is preferably, for example, cyclopentanone or toluene. Thereafter, this solution is coated on a plastic film such as a triacetylcellulose (TAC) film, an acrylic film, a polycarbonate film, a polyvinyl chloride film, a polyolefin film, or a polyethylene terephthalate (PET) film so that the thickness thereof is uniform as possible, and then is left to stand for a constant time under such a temperature condition that cholesteric liquid crystal is obtained on the plastic film and oriented at a desired helical pitch, preferably at 40 to 150° C. while the solvent is removed by heating. In this case, when orientation processing such as rubbing or stretching is performed on the surface of the plastic film before the coating, the cholesteric liquid crystal can be more uniformly oriented, and the haze value as the film can be reduced. Subsequently, while this orientation state is held, the film is irradiated with ultraviolet from, for example, a high-pressure mercury lamp to fix the orientation of the cholesteric liquid crystal, thereby obtaining the cholesteric liquid crystal layer forming the light reflection layer used in the present disclosure. When a chiral agent that causes right-handed helical orientation is selected, the light reflection layer is a light reflection layer R that selectively reflects right-handed circularly polarized light. When a chiral agent that causes left-handed helical orientation is selected, the light reflection layer is a light reflection layer L that selectively reflects left-handed circularly polarized light. This phenomenon that particular circularly polarized light is selectively reflected is referred to as selective reflection, and a selectively reflected wavelength band is referred to as a selective reflection region.

Since the light reflection layer has a reflection band, the reflected wavelength of the light reflection layer is expressed by using a central reflected wavelength as the central value of the reflection band. The central reflected wavelength means the central wavelength of the reflection band of the light reflection layer, and has a value, for example, at middle between wavelengths on the short wavelength side and the long wavelength side at which the transmittance is 75% in the reflection band in spectrometry. For example, when spectrometry of a light reflection layer obtains the wavelength of 500 nm on the short wavelength side and the wavelength of 600 nm on the long wavelength side, at which the transmittance is 75% in the reflection band, the central reflected wavelength of this light reflection layer is 550 nm. The transmittance used as a reference in calculation of the central reflected wavelength is optional and selected as appropriate depending on, for example, a waveform shape and the lowest transmittance of the reflection band. The waveform is not necessarily bilaterally symmetric. The transmittance of the lowest transmittance value+5 to 30% may be used as a reference because an interference band exists near the reflection band in some cases. When the optical film according to the present disclosure is applied to sunglasses, the central reflected wavelength of a light reflection layer is in the visible light range so that reflected light has a metallic color tone. The central reflected wavelength is preferably the range of 400 to 800 nm, more preferably the range of 410 to 780 nm, still more preferably the range of 430 to 700 nm. The central reflected wavelength in the visible light range at which the light reflection layer reflects left-handed circularly polarized light or right-handed circularly polarized light is selected as appropriate in accordance with a desired color tone. For example, the reflected light of the optical film has a metallic blue color for the central reflected wavelength of 450 nm, a metallic green color for the central reflected wavelength of 550 nm, and a metallic red color for the central reflected wavelength of 650 nm.

The light reflection layer may be any one of the light reflection layer R and the light reflection layer L. When a plurality of the light reflection layers are provided, each light reflection layer may be any one of the light reflection layer R and the light reflection layer L, but preferably all light reflection layers reflect circularly polarized light in an identical direction, in other words, they are either the light reflection layer R or the light reflection layer L. When the light reflection layer R and the light reflection layer L are both used in application of the optical film according to the present disclosure to eyewear, the light control layer cannot perform polarization conversion in an identical direction. In other words, the light control layer performs conversion into linearly polarized light including both of s-polarized light and p-polarized light, which potentially leads to a reduced antiglare effect, and thus degrades the function of polarization sunglasses. When a difference between the central reflected wavelengths of the selective reflection regions of the light reflection layers is equal to or smaller than 20 nm while the light reflection layer R and the light reflection layer L are both provided, the reduction of the antiglare effect can be minimized irrespective of conversion into linearly polarized light including both of s-polarized light and p-polarized light at the light control layer, and thus the eyewear can be used as polarization sunglasses. Thus, in such a case, both the light reflection layer R and the light reflection layer L can be provided.

In an example in which two or more light reflection layers are used, the light reflection layer R having a central reflected wavelength of 550 nm and the light reflection layer R having a central reflected wavelength of 650 nm are combined and laminated. With this configuration, right-handed circularly polarized light near 550 nm and right-handed circularly polarized light near 650 nm can be both reflected, and reflected light having a golden color can be obtained. Combination of the central reflected wavelengths of such light reflection layers is not particularly limited, and complicated and various kinds of reflection colors can be obtained in accordance with a desired combination.

When a plurality of light reflection layers are provided, the method of laminating the light reflection layers is not particularly limited. The light reflection layers may be directly laminated, but preferably laminated by using an adhesive agent or a bonding agent. The adhesive agent is an acrylic or rubber adhesive agent, but is preferably the acrylic adhesive agent, which allows easy adjustment of bonding and holding properties. The bonding agent is an ultraviolet curable resin composition or a heat curable resin composition. When the bonding agent is an ultraviolet curable resin, a composition as a mixture of two or more monomers containing an acryloyl group or an epoxy group can be cured through ultraviolet irradiation together with a photopolymerization initiator, thereby achieving bonding between the light reflection layers. When the bonding agent is a heat curable resin composition, a composition as a mixture of two or more monomers containing an epoxy group can be cured through heating together with an acid catalyst, thereby achieving bonding between the light reflection layers. Alternatively, a composition of two or more monomers or polymers containing an amino group, a carboxyl group, or a hydroxyl group can be cured through heating together with a compound containing an isocyanate group or melamine, thereby achieving bonding between the light reflection layers.

(Light Control Layer)

In the optical film for eyewear according to the present disclosure, phase difference element called quarter wave plate is used as the light control layer. The light control layer is arranged on the front side of the optical film. A quarter wave plate used as a light control layer is a phase difference element having a function to convert circularly polarized light into linearly polarized light, and can be obtained by uniaxially stretching a film made of, for example, polycarbonate or cycloolefin polymer to have a phase difference equal to a quarter wavelength or by orienting horizontally oriented polymerizable liquid crystal with a thickness to have a phase difference equal to a quarter wavelength. This quarter wave plate may be used alone, or a phase difference element called wide band quarter wave plate may be used when a shift of the phase difference is large due to wavelength dispersion. The wide band quarter wave plate is a phase difference element with reduced wavelength dependency of the phase difference, and is, for example, a phase difference element obtained by laminating a half wave plate and a quarter wave plate having same wavelength dispersion so that the angle between the slow axes thereof is 60°, or a polycarbonate phase difference element (PURE-ACE WR-S manufactured by Teijin Limited, or R-film or RD film manufactured by KANEKA CORPORATION) with reduced wavelength dependency of the phase difference.

It is known that light reflected at, for example, a water surface, a road surface, or a snow surface contains a large amount of linearly polarized light component in a lateral direction, called s-polarized light. When s-polarized light is incident on the light control layer provided on the front side of the optical film, the light control layer converts the s-polarized light into left-handed circularly polarized light or right-handed circularly polarized light. To allow the circularly polarized light converted from the s-polarized light by the light control layer to be effectively reflected by the light reflection layer, the slow axis of the light control layer is preferably arranged in a direction that the s-polarized light incident on the light control layer is converted into circularly polarized light in a direction same as the direction of the circularly polarized light reflected by the light reflection layer. For example, when the light reflection layer R that reflects right-handed circularly polarized light is used as the light reflection layer, the arrangement direction of the slow axis of a quarter wave plate used as the light control layer arranged on the front side of the optical film is set so that s-polarized light incident on the light control layer can be converted into right-handed circularly polarized light. In this manner, the property of selective reflection of circularly polarized light that the light reflection layer has can be effectively used by controlling the arrangement direction of the slow axis of the light control layer. Accordingly, s-polarized light incident on the optical film is effectively reflected, and as a result, the optical film achieves an increased antiglare effect.

When the slow axis of the light control layer is arranged so that incident light is converted into circularly polarized light in a direction opposite to that of circularly polarized light reflected by the light reflection layer, light shielded in the reflection band of the light reflection layer is transmitted. Thus, the eyewear wearer sees light transmitted through the optical film for eyewear as colored transmitted light.

(Polarization Degree)

The optical film for eyewear according to the present disclosure has a high polarization degree in the vicinity of the central reflected wavelength (reflected wavelength region) of the light reflection layer. The polarization degree is the ratio of the light intensity of a polarized component relative to the whole light intensity, and a higher polarization degree means higher polarization performance. When the light reflection layer has a single-layer structure and a narrow reflection band, the polarization degree does not take a high value after conversion into a luminosity-corrected polarization degree, which is typically used, but has a high value in a particular wavelength. For example, when the light reflection layer has a central wavelength of 480 nm, the optical film has a high polarization degree near 480 nm. This has the effect that, when grass grain is checked in golf or the like, the grass grain can be easily recognized by using the optical film for eyewear having a high polarization degree near 480 nm, which is close to the boundary between green and blue. Thus, the optical film for eyewear according to the present disclosure including the light reflection layer having a central reflected wavelength of 480 nm is excellently applicable to golf sunglasses.

The reflection wavelength band is widened by providing a plurality of light reflection layers having different central reflected wavelengths. Such an optical film for eyewear according to the present disclosure also has a high luminosity-corrected polarization degree and achieves high polarization performance in a wide wavelength band, thereby obtaining a high antiglare effect.

<Optical Laminate>

Figure 2:
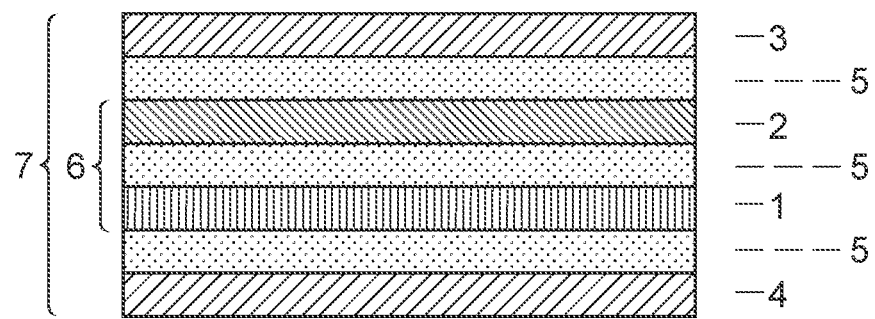
FIG. 2 is a side sectional view illustrating a typical embodiment of an optical laminate according to the present disclosure.

An optical laminate according to the present disclosure can be obtained by sandwiching the optical film for eyewear obtained as described above between two support bodies. FIG. 2 illustrates an embodiment of the optical laminate according to the present disclosure. In this optical laminate 7 illustrated in FIG. 2, the optical film 6 according to the present disclosure in which the light control layer 2 and the light reflection layer 1 are laminated in this order with the bonding layer 5 made of a bonding agent or an adhesive agent interposed therebetween is further sandwiched between a first support body 3 and a second support body 4 with the bonding layer 5 interposed therebetween. In other words, the optical laminate 7 according to the present disclosure includes the first support body 3, the second support body 4, and the optical film 6 arranged between the first support body 3 and the second support body 4. In FIG. 2, the layers forming the optical laminate 7 are laminated with the bonding layer 5 interposed therebetween, but the light control layer 2, the light reflection layer 1, the first support body 3, and the second support body 4 may be directly laminated. The first support body 3 or the second support body 4 may be arranged between the light control layer 2 and the light reflection layer 1. When the first support body 3 or the second support body 4 is arranged in this manner, advantage such as increased strength of the optical laminate can be obtained. When the optical laminate illustrated in FIG. 2 is applied to eyewear, the first support body 3 is arranged on a side on which light is incident on the optical laminate 7, in other words, the "front side" of the optical laminate, and the second support body 4 is arranged on the viewer side, in other words, the "back side" of the optical laminate. The quarter wave plate as the light control layer 2 may function as the first support body 3. In such a case, the optical laminate 7 may have a configuration without the first support body 3.

The first support body and the second support body used in the present disclosure are preferably each a substrate made of a plastic material. Examples of the plastic material include resin such as polycarbonate, polyamide, and triacetylcellulose (TAC). In eyewear such as sunglasses and goggles, for which impact resistance and thermal resistance are requested, the support bodies are preferably made of polycarbonate, more preferably made of aromatic polycarbonate containing bisphenol A. In order to easily obtain visibility, the entire light beam transmittance of each support body is preferably equal to or higher than 70%, more preferably equal to or higher than 80%, still more preferably equal to or higher than 85%. At manufacturing of each layer of the optical film according to the present disclosure, when optimum processing temperature is low, the support bodies are preferably made of, for example, aromatic polycarbonate and PCC composition (wholly alicyclic polyester composition), or polyamide having a glass transition temperature of 130° C. or lower. The plastic materials of the first support body and the second support body may be identical or different.

The method of laminating the light reflection layer and the light control layer included in the optical film for eyewear according to the present disclosure and the method of sandwiching the optical film between the first and second support bodies are not particularly limited. For example, the layers and the support bodies may be directly laminated, but are preferably laminated with a bonding layer interposed therebetween to obtain high bonding power. The bonding layer may be made of any of a hot-melt bonding agent and a curable bonding agent. Typically, the curable bonding agent may be made of acrylic resin material, urethane resin material, polyester resin material, melamine resin material, epoxy resin material, or silicone material. An adhesive agent may be used in place of the bonding agent. The adhesive agent is not particularly limited, but may be, for example, acrylic adhesive agent or a rubber adhesive agent. Regarding the first and second light control layers, when the slow axis or fast axis of the quarter wave plate used as the light control layer is angled at 45° relative to the longitudinal direction of the rolled quarter wave plate, the optical film including a quarter wave plate in which the slow axis or fast axis of which is angled at 45° relative to the longitudinal direction of the roll can be obtained by laminating the rolled quarter wave plate and the rolled light reflection layer through roll-to-roll processing.

The optical film for eyewear or the optical laminate according to the present disclosure thus obtained is arranged so that the light control layer or the first support body is positioned on the outer side of the eyewear with respect to the viewer. Then, the optical film or the optical laminate is shaped into a desired shape appropriate for the eyewear and fixed to, for example, a frame, thereby obtaining eyewear such as sunglasses, goggles, or a helmet visor including the optical film for eyewear or the optical laminate according to the present disclosure. For example, in a case of sunglasses, the optical laminate is punched into a desired shape and then provided with bending. The bending is not limited to a particular method, but the optical laminate may be provided with bending into a spherical surface shape or an aspherical surface shape in accordance with a desired shape. A product obtained through the bending may be further provided with resin injection molding. This can prevent image distortion due to unevenness in the thickness of the optical laminate, and achieve particularly excellent effects on impact resistance, appearance, and eye fatigue of a lens with no focal position refractive power. The injected resin is preferably material same as that of a layer with which the resin contacts to prevent appearance degradation due to refractive index difference. For example, a hard coat and an antireflection film may be provided on the surface of the optical laminate as appropriate. Sunglasses can be obtained by fixing the optical laminate provided with the bending or the injection molding to a frame and the like through, for example, lens grinding, boring, and fastening by screw.

<Eyewear>

The eyewear according to the present disclosure can be used as protection glasses for reducing brightness after a cataract operation. When an intraocular lens (artificial crystalline lens) is inserted in an eye in the cataract operation, cloud in the crystalline lens is abruptly removed, and as a result, a large amount of external light enters into the intraocular lens, causing brighter or too bright view. Furthermore, the intraocular lens typically transmits light on the short wavelength side, and thus blue light is more likely to enter into the eye than before the cataract operation. Eyewear using the optical film according to the present disclosure can include at least one light reflection layer having a central reflected wavelength of 400 to 500 nm. When such eyewear including the optical film according to the present disclosure is used as protection glasses for use after a cataract operation, blue light can be reflected to achieve reduced brightness.

The eyewear according to the present disclosure has polarization performance at a particular wavelength (the reflection band of the light reflection layer). Accordingly, brightness after a cataract operation can be further reduced for light bounced at, for example, a road surface, and thus characteristics more excellent than that of existing protection glasses can be obtained. Furthermore, visible light having a wavelength longer than 500 nm is cut when brightness is reduced with existing protection glasses, which leads to the problem of reduction of visible light transmittance as glass lenses. However, eyewear including the optical film or optical laminate according to the present disclosure can reduce brightness without reduction of visible light transmittance.

EXAMPLES

The present disclosure will be exemplarily described below in detail with reference to examples. In the examples, the word "parts" means "parts by weight". The present disclosure is not limited to the examples described below.

<Preparation of Cholesteric Liquid Crystal Coating Liquid>

Formulation examples 1 to 3 of cholesteric liquid crystal coating liquid having compositions listed in Table 1 were prepared.

TABLE 1

Composition table of coating liquid in Formulation examples 1 to 3

| Material (kind) | Material name (manufacturer) | Amount added (parts by weight) | | |
| --- | --- | --- | --- | --- |
| | | Formulation example 1 | Formulation example 2 | Formulation example 3 |
| Polymerizable liquid crystal monomer | LC242 (BASF) | 20.00 | 20.00 | 20.00 |
| Chiral agent | LC756 (BASF) | 1.43 | 1.22 | 1.09 |
| Photopolymerization initiator | IrgacureTPO (BASF) | 1.00 | 1.00 | 1.00 |
| Solvent | Cyclopentanone | 80.00 | 80.00 | 80.00 |

Example 1

<Production of Light Reflection Layer>

Formulation example 1 of the cholesteric liquid crystal coating liquid was used to produce a light reflection layer through the following procedures. A used plastic film was a PET film (having the product name "A4100" and a thickness of 50 µm) manufactured by Toyobo Co., Ltd and including no basecoat layer provided with rubbing processing.

(1) Coating liquid of Formulation example 1 was coated on the PET film at room temperature by using a wire bar so that a film after drying had a thickness of 1.8 µm, thereby a coated film was formed.

(2) The obtained coated film was heated at 150° C. for five minutes to obtain a cholesteric liquid crystal phase with removing solvent. Then, the cholesteric liquid crystal layer was subjected to UV irradiation at power of 120 W for 5 to 10 seconds by a high-pressure mercury lamp (HX4000L; manufactured by HARISON TOSHIBA LIGHTING Corporation) to fix the cholesteric liquid crystal phase, thereby producing the light reflection layer.

In this manner, the light reflection layer R that reflects right-handed circularly polarized light was obtained. The reflection spectrum of the obtained light reflection layer R was measured by using spectrophotometer UV-3600 manufactured by Shimadzu Corporation to acquire the central reflected wavelength of selective reflection. The central reflected wavelength was 480 nm for the light reflection layer R.

<Preparation of Light Control Layer>

As the light control layer, a quarter wave plate of RD film-No 140 (retardation value: 140 nm, average thickness: 58 μm) manufactured by KANEKA CORPORATION was used.

<Production of Optical Film>
(1) The light reflection layer and the light control layer, which were produced in the above-described manner, were laminated together by using an acrylic adhesive agent.
(2) Then, the PET film on the light reflection layer side was removed. In this case, the slow axis of the light control layer was arranged so that any incident s-polarized light was converted into right-handed circularly polarized light. In this manner, an optical film in which the light control layer and the light reflection layer were laminated was produced.

Example 2

An optical film was produced through a procedure similar to that in Example 1 except that coating liquid of Formulation example 2 was used in place of the coating liquid of Formulation example 1 and the coating was performed so that the film thickness after coating and drying was 2.0 μm in place of 1.8 μm.

The coating liquid of Formulation example 2 was used to produce the light reflection layer R that reflects right-handed circularly polarized light. Similarly to Example 1, the reflection spectrum of the obtained light reflection layer R was measured to acquire the central reflected wavelength of selective reflection. The central reflected wavelength of the light reflection layer R was 555 nm.

Example 3

An optical film was produced through a procedure similar to that in Example 1 except that coating liquid of Formulation example 3 was used in place of the coating liquid of Formulation example 1 and the coating was performed so that the film thickness after coating and drying was 2.0 μm in place of 1.8 μm.

The coating liquid of Formulation example 3 was used to produce the light reflection layer R that reflects right-handed circularly polarized light. Similarly to Example 1, the reflection spectrum of the obtained light reflection layer R was measured to acquire the central reflected wavelength of selective reflection. The central reflected wavelength of the light reflection layer R was 620 nm.

Example 4

An optical film was obtained through a procedure similar to that in Example 1 except that a three-layer light reflection layer R obtained by laminating the light reflection layers R obtained in Examples 1 to 3 by using an acrylic adhesive agent was used as the light reflection layer. The PET film was all removed at the lamination of the light reflection layer R.

Comparative Example 1

An optical film without a light control layer was produced by using only the light reflection layer R obtained through a procedure similarly to that in Example 1.

Comparative Example 2

An optical film without a light control layer was produced by using only the light reflection layer R obtained through a procedure similarly to that in Example 2.

Comparative Example 3

An optical film without a light control layer was produced by using only the light reflection layer R obtained through a procedure similarly to that in Example 3.

Comparative Example 4

An optical film without a light control layer was produced by using only the light reflection layer R obtained through a procedure similarly to that in Example 4.

Comparative Example 5

A commercially available medical filter lens (cataract protection glasses) LHV26-005-3 (brown NA50) (optical lens) manufactured by OPT MEDICAL was used.

[Method of Evaluating Characteristics]

<Central Reflected Wavelength and Minimum Transmittance of the Light Reflection Layer>

Figure 3:
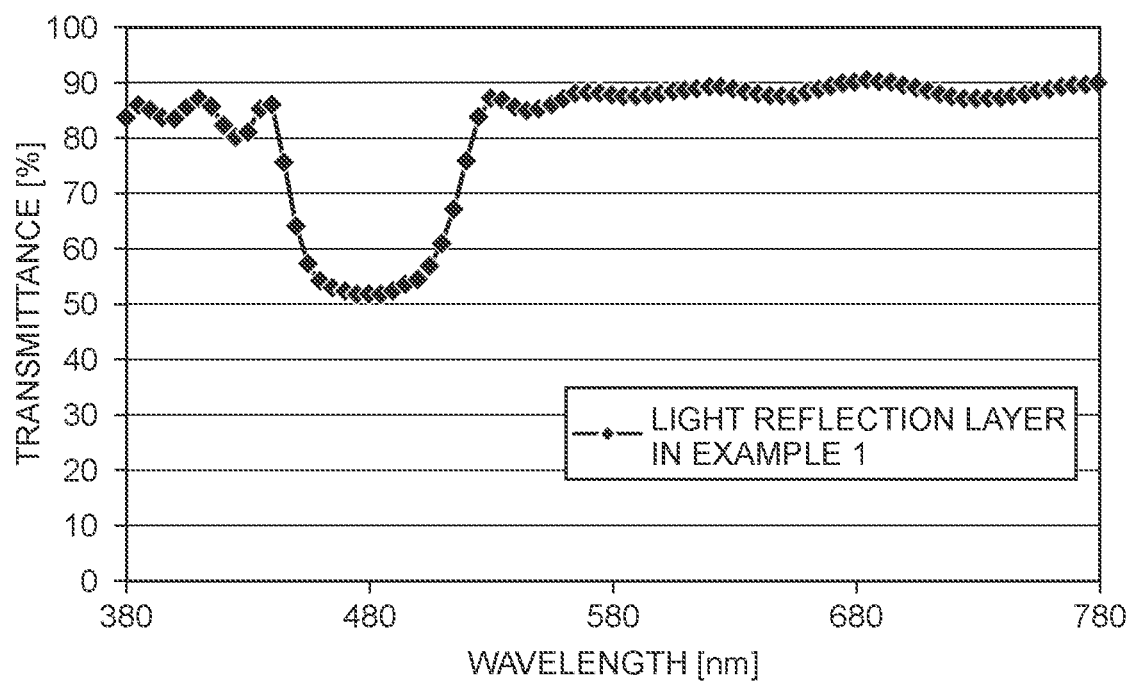
FIG. 3 illustrates spectrum data of the transmittance of a light reflection layer used in Example 1 and Comparative Example 1.
Figure 4:
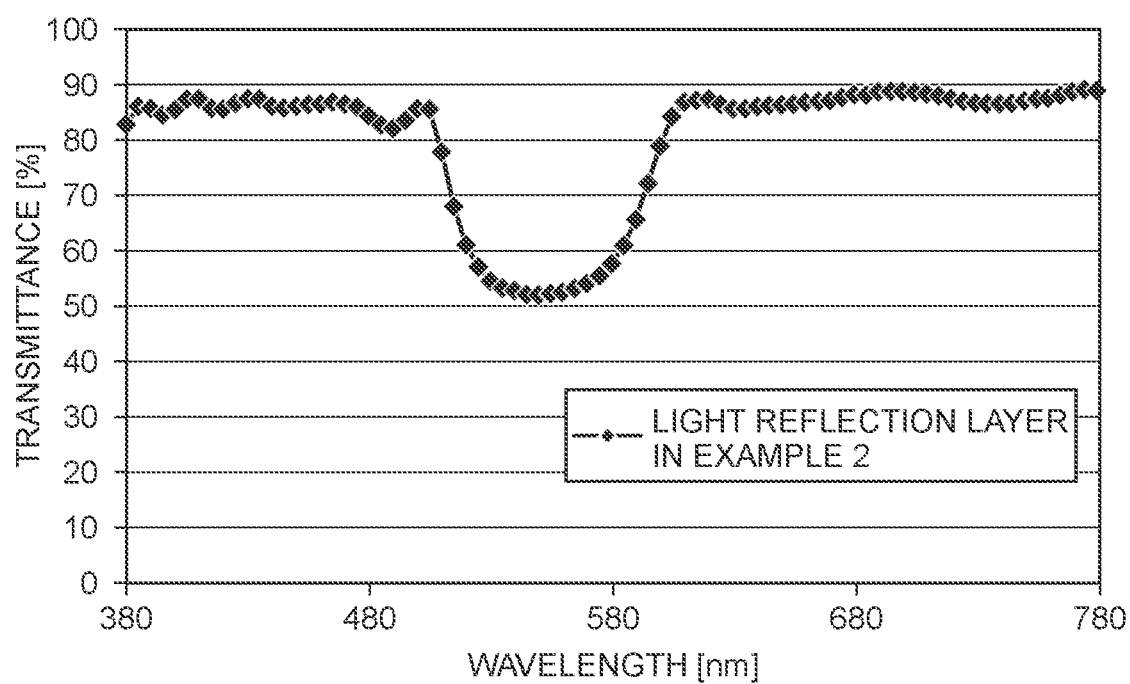
FIG. 4 illustrates spectrum data of the transmittance of a light reflection layer used in Example 2 and Comparative Example 2.
Figure 5:
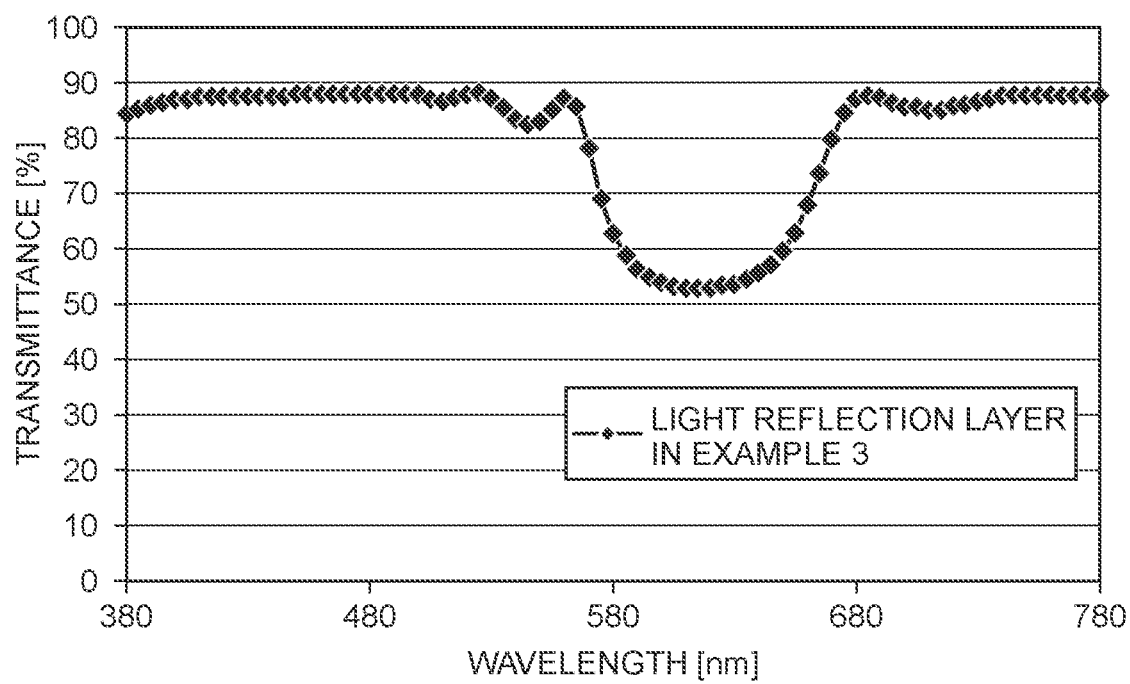
FIG. 5 illustrates spectrum data of the transmittance of a light reflection layer used in Example 3 and Comparative Example 3.
Figure 6:
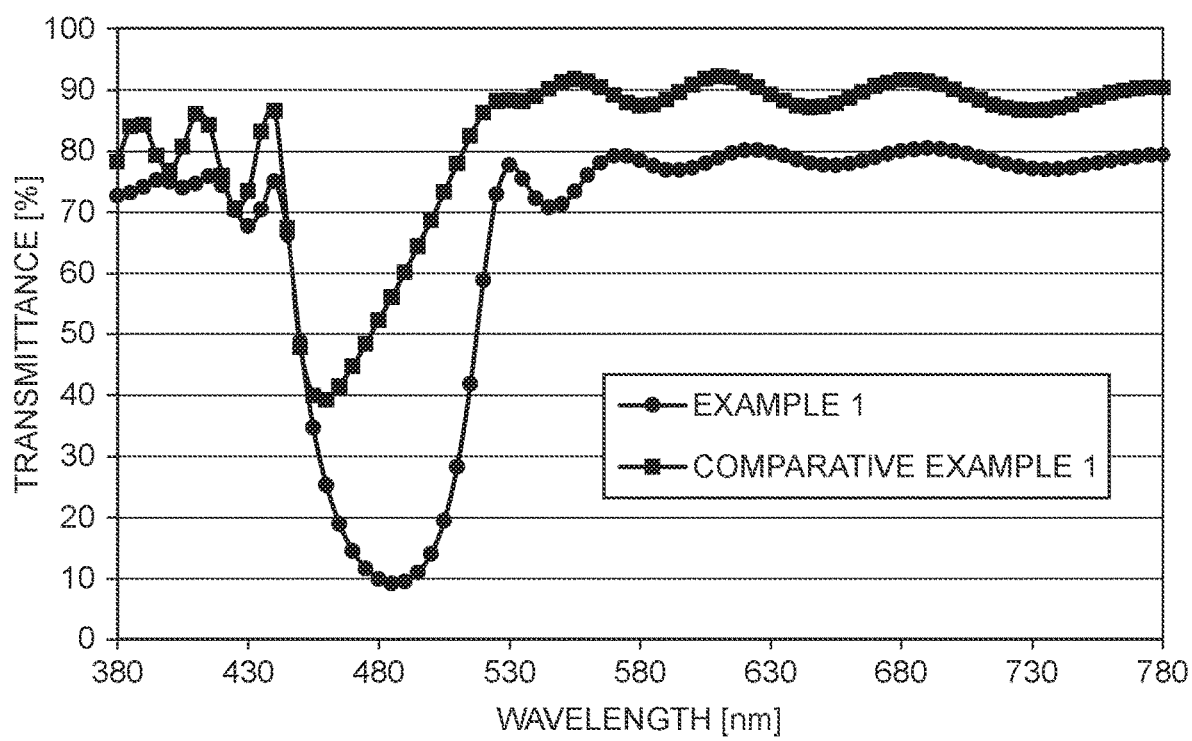
FIG. 6 illustrates spectrum data of the transmittance of each of an optical film in Example 1 and Comparative Example 1, the reflection color of which is blue.
Figure 7:
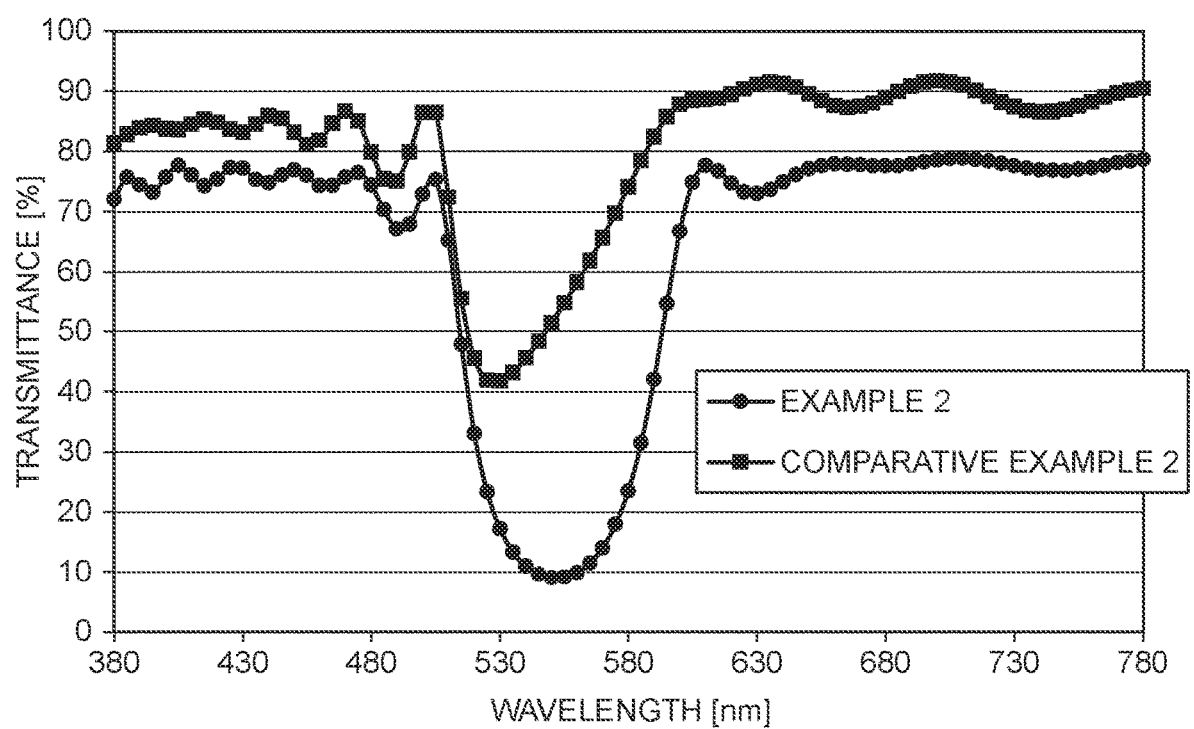
FIG. 7 illustrates spectrum data of the transmittance of each of an optical film in Example 2, Comparative Example 2, the reflection color of which is green.
Figure 8:
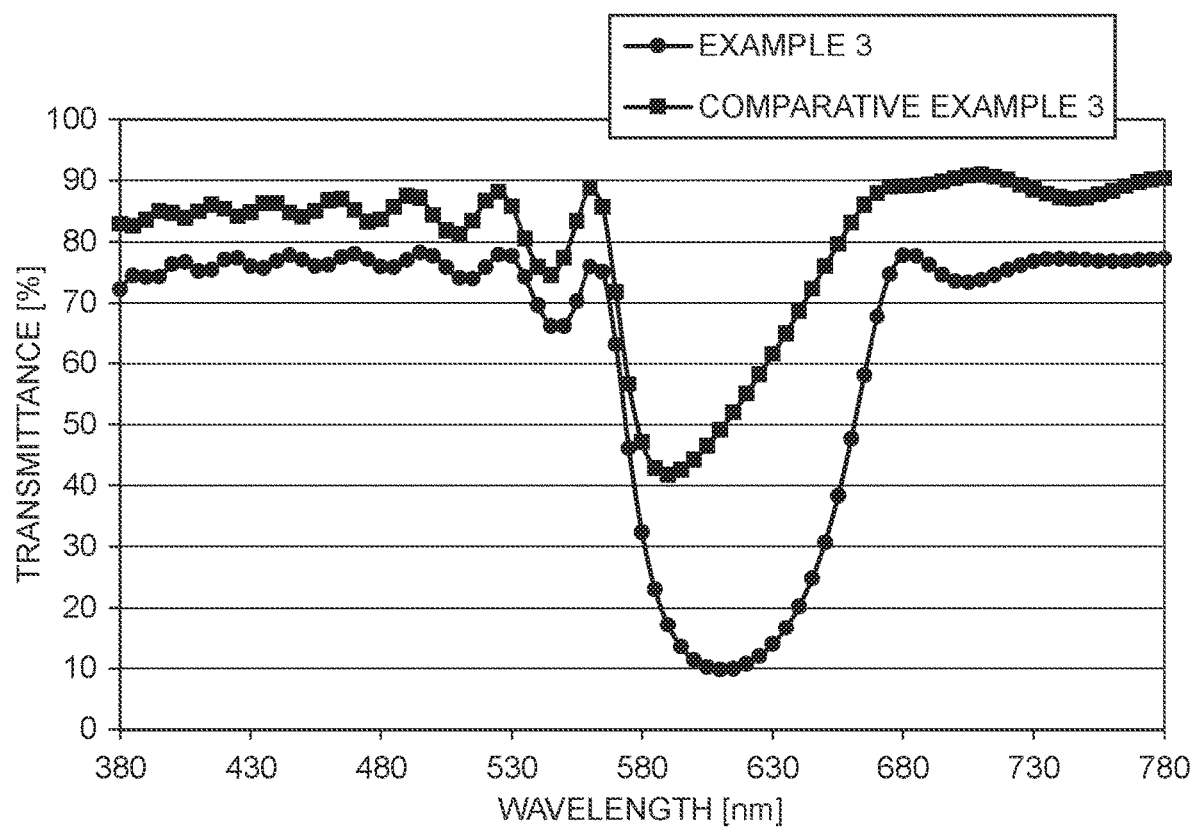
FIG. 8 illustrates spectrum data of the transmittance of each of an optical film in Example 3 and Comparative Example 3, the reflection color of which is orange.
Figure 9:
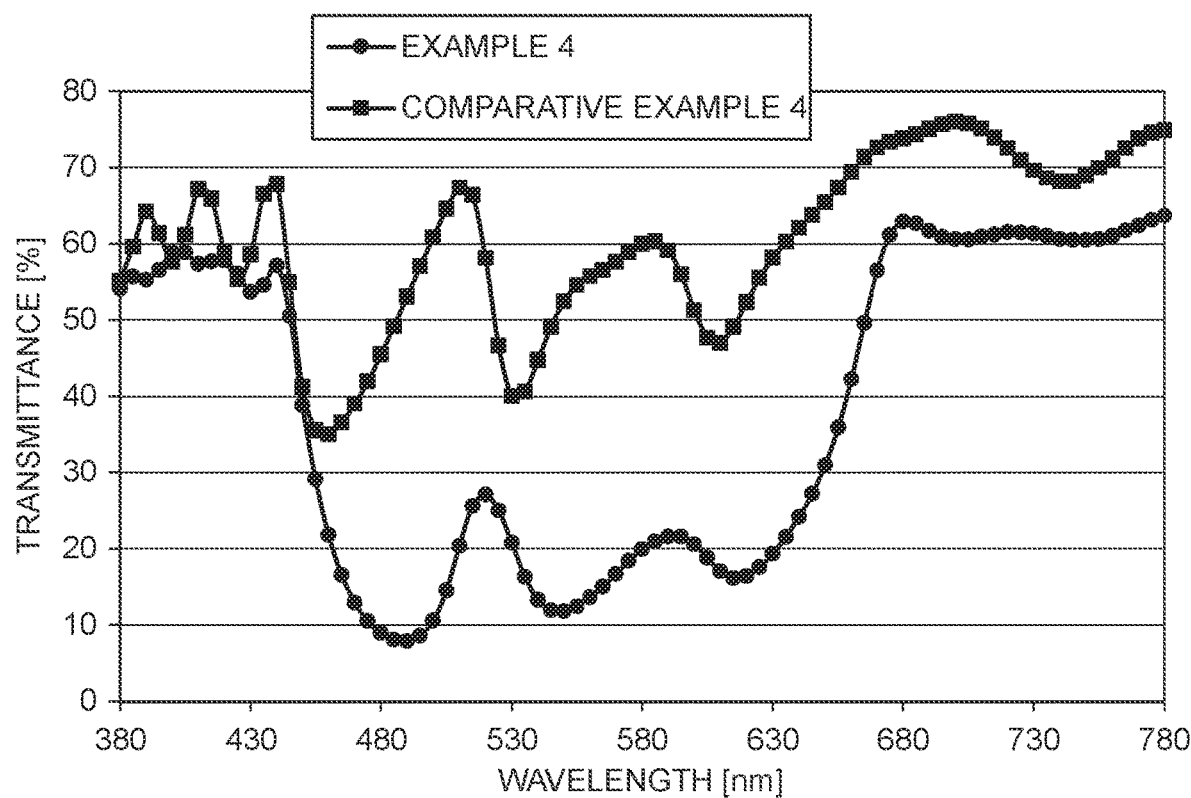

The transmissivities of the light reflection layers R produced in Examples 1 to 3 were measured by using spectrophotometer UV-3600 manufactured by Shimadzu Corporation. The light source was a C light source. FIGS. 3 to 5 illustrate spectrum data of the obtained transmittances. The average value of wavelengths at which spectral transmittance is 75% on the short wavelength side and the long wavelength side in the reflection band of the light reflection layer was used as the central reflected wavelength [nm]. The minimum value of the transmittance in the reflection band was used as the minimum transmittance [%]. In Example 4 and Comparative Example 4, since the three-layer light reflection layer was used, the central reflected wavelength of the light reflection layer was not calculated.

<Minimum Transmittance of Optical Lens>

The minimum transmittance of the optical lens used in Comparative Example 5 was measured by using spectrophotometer UV-3600 manufactured by Shimadzu Corporation. The light source was a C light source. The optical lens in Comparative Example 5 has ultraviolet absorption capability by an ultraviolet absorption agent, and thus the transmittance at a wavelength band shorter than 420 nm cannot be used as a comparison target. Thus, a wavelength band at which the measurement is performed was 420 to 780 nm. This is same in blue light cut rate evaluation described below.

<Polarization Degree of Optical Film>

The transmittances of the optical films in Examples 1 to 4 and Comparative Examples 1 to 4 were measured by using spectrophotometer UV-3600 manufactured by Shimadzu Corporation. The light source was a C light source. FIGS. 6 to 9 illustrate the obtained transmittances. The measurement was performed by an absolute polarization method using a polarization plate having a polarization degree of 99.99%. In Examples 1 to 4, the axial direction of the optical film for eyewear was set so that s-polarized light emitted through the polarization plate having a polarization degree of 99.99% was converted into right-handed circularly polarized light through the light control layer. A transmittance obtained by measuring the optical film in such an arrangement relation is represented by Tc [%]. A transmittance obtained by measuring the optical film when rotated by 90° from this arrangement relation is represented by Tp [%]. In Comparative Examples 1 to 4, the optical film has no restriction on the axial direction, and thus no restriction on the set position, but the optical film was set so that s-polarized light emitted through the polarization plate having a polarization degree of 99.99% was parallel to a coating direction of the light reflection layer. A transmittance obtained in this arrangement relation is represented by Tc [%]. The coating direction is a direction in which the cholesteric liquid crystal coating liquid is coated on the PET film by using a wire bar at production of the light reflection layer, in other words, the moving direction of the wire bar. A transmittance obtained by measuring the optical film when rotated by 90° from this disposition relation is represented by Tp [%]. In the examples and the comparative examples, the polarization degree was calculated by an equation below.

Polarization degree=$[(Tp-Tc)/(Tp+Tc)]\times 100$   [Equation 1]

Among polarization degrees in a wavelength band of a measurement range, a wavelength at which the highest polarization degree was obtained is represented by λmax, and the highest polarization degree is represented by Pmax. A polarization degree calculated by using the luminosity-corrected transmittance is represented by Py. As these polarization degrees are higher, a ratio that incident s-polarized light is reflected by the optical film and reaches the wearer when the optical film is applied to eyewear is lower, which indicates a higher antiglare effect.

ization degree was calculated by substituting Tc and Tp thus obtained into the above-described equation. The λmax and Pmax in the wavelength band of the measurement range were set to be values between 420 to 780 nm with the ultraviolet absorption capability of the optical lens taken into consideration.

<Visible Light Average Transmittance of Optical Film and Lens>

The values of the transmittance measured for the polarization degrees of the above-described optical film and optical lens were used to calculate a Y value as a tristimulus value according to JIS Z 8722:2009, and the Y value was set to be the visible light average transmittance [%] of the optical film or the optical lens.

<Blue Light Cut Rate of Optical Film and Lens>

Figure 10:
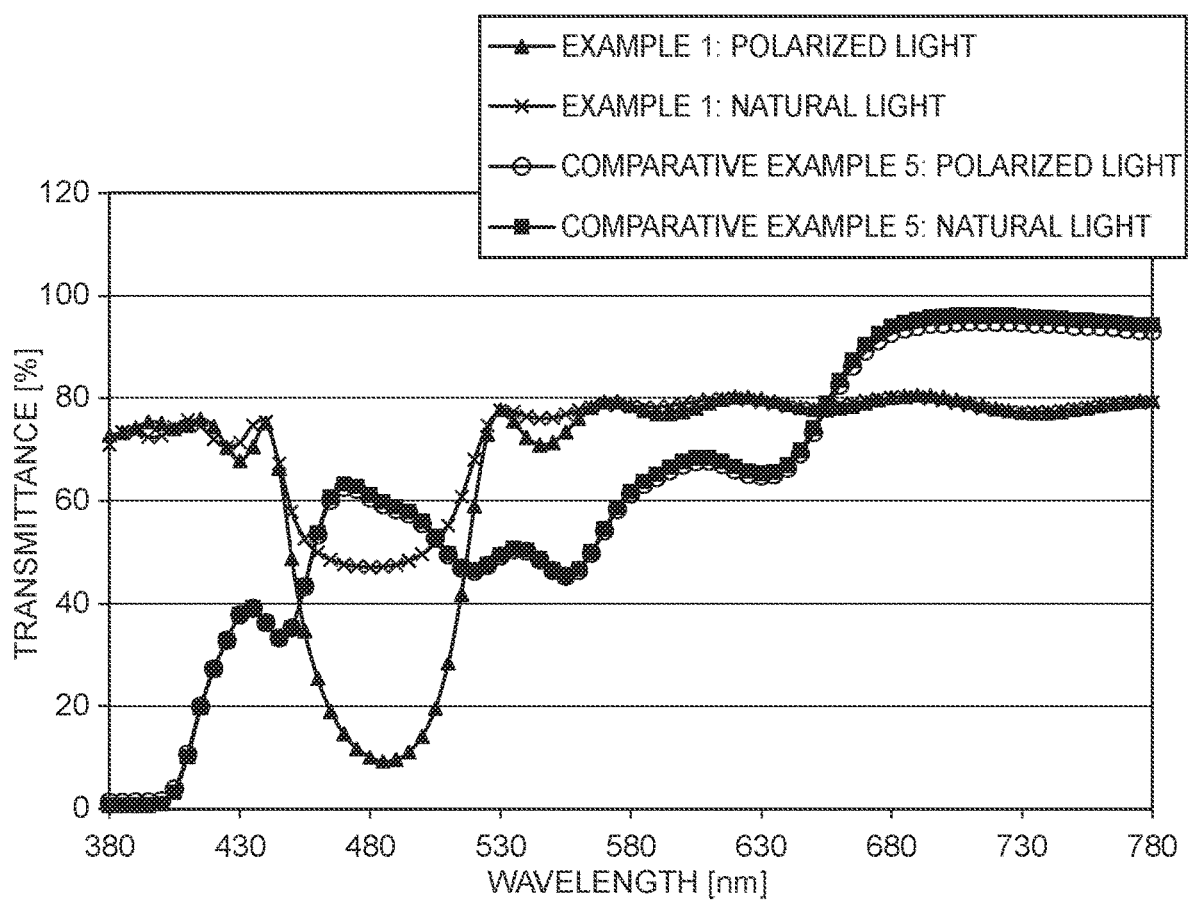
FIG. 10 illustrates spectrum data of natural light transmittance and polarized light transmittance of the optical film in Example 1 and an optical lens in Comparative Example 5.

The blue light cut rate was obtained in Example 1 and Comparative Example 5. The blue light cut rate in a wavelength of 420 to 495 nm was calculated according to a blue light hazard described in Appendix C of JIS T 7333:2005. For a reason similarly to that for the above-described measurement of the lens minimum transmittance, the transmittance at a wavelength shorter than 420 nm was not used as a comparison target. FIG. 10 illustrates spectrum data of the natural light transmittance and the polarized light transmittance thus obtained.

Table 2 lists evaluation results in Examples 1 to 4, and Table 3 lists evaluation results in Comparative Examples 1 to 5.

TABLE 2

Evaluation results in examples 1 to 4

| | Item | Example 1 | Example 2 | Example 3 | Example 4 |
|---|---|---|---|---|---|
| Light reflection layer | Central reflected wavelength [nm] | 480 | 555 | 620 | — |
| | Minimum transmittance [%] | 51.6 | 52.5 | 52.7 | 52.5 |
| Optical film | λmax [nm] | 485 | 550 | 610 | 490 |
| | Pmax [%] | 64.5 | 65.9 | 63.5 | 66.7 |
| | Py [%] | 8.5 | 38.8 | 18.9 | 59.6 |
| | Visible light average transmittance [%] | 73.4 | 58.8 | 67.8 | 44.3 |
| | Blue light cut rate [%] | 40.4 | — | — | — |
| | Light reflection color | Blue | Green | Orange | Silver |

TABLE 3

Evaluation results in comparative examples 1 to 5

| | Item | Comparative example 1 | Comparative example 2 | Comparative example 3 | Comparative example 4 | Comparative example 5 |
|---|---|---|---|---|---|---|
| Light reflection layer (Optical Lens) | Central reflected wavelength [nm] | 480 | 555 | 620 | — | — |
| | Minimum transmittance [%] | 51.6 | 52.5 | 52.7 | 52.5 | 32.8 |
| Optical film (Optical Lens) | λmax [nm] | 455 | 580 | 680 | 510 | 700 |
| | Pmax [%] | 9.1 | 7.9 | 7.9 | 9.7 | 1.5 |
| | Py [%] | 4.8 | 2.4 | 5.9 | 11.0 | 0.8 |
| | Visible light average transmittance [%] | 81.8 | 65.0 | 75.6 | 48.5 | 55.4 |
| | Blue light cut rate [%] | — | — | — | — | 54.4 |
| | Light reflection color | Blue | Green | Orange | Silver | None |

<Polarization Degree of Optical Lens>

The transmittance of the optical lens used in Comparative Example 5 was measured by a similar method. The optical lens was set at a position at which incident s-polarized light was least transmitted. A transmittance obtained by measuring the optical lens in such a arrangement relation is represented by Tc [%]. A transmittance obtained by measuring the optical lens when at a position rotated by 90° from this arrangement relation is represented by Tp [%]. The polar- The optical films in Examples 1 to 4 each exhibited a metallic color tone. As indicated in Table 3, the luminosity-corrected polarization degree Py and the maximum polarization degree Pmax near the central wavelength of the light reflection layer were both low for the optical films in Comparative Examples 1 to 4. In the optical films in Examples 1 to 3, since the light reflection layer has a narrow wavelength band, the luminosity-corrected polarization degree Py has low values as indicated in Table 2, but those values are higher than the corresponding values of Comparative Examples 1 to 3. In each Examples, the maximum polarization degree Pmax near the central reflected wavelength has high values. This indicates that the optical film according to the present disclosure has excellent polarization performance and achieves a high antiglare property. Since the optical film in Example 4 including the three-layer light reflection layer has a wide wavelength band, the maximum polarization degree Pmax and the luminosity-corrected Py both have extremely high values. This indicates that the optical film according to the present disclosure including a plurality of light reflection layers has more excellent polarization performance and achieves a higher antiglare property. Accordingly, the optical film according to the present disclosure does not include a linear polarization element but achieves a high antiglare property and exhibits reflected light in a metallic color tone, and thus can be used to produce eyewear having such characteristics at lower cost.

As indicated in Tables 2 and 3 and FIG. 10, the optical film in Example 1 has a relatively high blue light cut rate, and also has a high visible light average transmittance as compared to that of existing protection glasses in Comparative Example 5. Since the optical film in Example 1 has a central reflected wavelength of 485 nm, high polarization performance was obtained for reflected light in a region of blue color. Thus, the optical film in Example 1 has polarization performance at a particular wavelength, and thus has a function to cut light bounced at a road surface. This indicates that eyewear including the optical film in Example 1 is useful as protection glasses for use after a cataract operation.

An optical film according to the present disclosure and an optical laminate using the optical film can be used to produce, at lower cost, eyewear that achieves a high antiglare property and exhibits reflected light in a metallic color tone without using a linear polarization element, and thus are preferable for application to eyewear such as sunglasses, goggles, and a helmet visor.

What is claimed is:

1. An optical film for eyewear comprising a light control layer and two or more light reflection layers laminated in this order from an outer side with respect to a viewer, wherein the outer side with respect to the viewer is a side on which light is incident on the optical film when the optical film is applied to the eyewear,
    the light reflection layers including a cholesteric liquid crystal layer that reflects left-handed circularly polarized light or right-handed circularly polarized light in a visible light range;
    the light control layer being a quarter wave plate; and
    each of the light reflection layers reflecting circularly polarized light in an identical direction.

2. The optical film for eyewear according to claim 1, wherein a slow axis of the light control layer is arranged in a direction in which s-polarized light incident on the light control layer is converted into circularly polarized light in a direction the same as the direction of circularly polarized light reflected by the light reflection layers.

3. An optical laminate comprising a first support body, a second support body, and the optical film for eyewear according to claim 1 arranged between the first support body and the second support body.

4. The optical laminate according to claim 3, wherein the first support body and the second support body are each a substrate formed of a plastic material.

5. Eyewear comprising the optical laminate according to claim 3.

6. Eyewear comprising the optical film according to claim 1.

7. The eyewear according to claim 6, the eyewear being protection glasses for use after a cataract operation.

* * * * *